UNITED STATES PATENT OFFICE.

EMMA J. WOODRUFF, OF CHICAGO, ILLINOIS.

PROCESS OF TREATING BUTTER.

SPECIFICATION forming part of Letters Patent No. 327,636, dated October 6, 1885.

Application filed August 17, 1885. Serial No. 174,671. (No specimens.)

*To all whom it may concern:*

Be it known that I, EMMA J. WOODRUFF, a citizen of the United States, residing at Chicago, in the county of Cook and State of Illinois, have invented certain new and useful Improvements in Processes for Treating Butter, of which the following is a specification, to wit:

This invention relates to processes for treating butter; and it consists in certain peculiarities of the materials used and manner of operating, substantially as will be hereinafter more fully set forth and claimed.

In order to enable others skilled in the art to which my invention pertains to avail themselves of its benefits, I will now proceed to describe its compounding and use.

In the ordinary mode of producing butter from milk or cream by churning, very much of the solid matter contained in the fluid is lost, and remains in what is known as "buttermilk," and it also requires a considerable time and much agitation to produce the quantity of butter obtained. To shorten the time and labor so expended and materially increase the yield of butter is the object of my invention, and I proceed as follows:

To each gallon of milk used I add certain ingredients, in about the proportions named, as follows: one gallon of milk, one tea-spoonful of white-wine rennet, one tea-spoonful of sugar, one tea-spoonful of salt, one-fourth tea-spoonful bicarbonate of soda, five grains of bicarbonate potassium, ten grains of alum, four pounds of good butter. These ingredients, in about the proportions herein stated, are placed in a churn of any usual or desired construction, and agitated in the usual manner, and the butter will be produced in much less time than usual, and all the solid matter withdrawn from the fluid, leaving only a thin water as a residue.

This process is especially applicable to churning in large quantities in creameries or butter-factories, and produces a large yield of rich and wholesome butter.

I do not desire to confine myself to the exact quantities of each ingredient above stated, but find that the proportions herein given are suited for the largest and purest yield of butter from a given quantity of milk.

Having thus fully described my invention, what I claim as new, and desire to secure by Letters Patent, is—

The herein-described method of treating butter, consisting in adding to the milk white-wine rennet, sugar, salt, bicarbonate of soda, bicarbonate potassium, alum, and butter, in about the proportions herein specified, substantially as and for the purpose set forth.

In testimony whereof I affix my signature in presence of two witnesses.

EMMA J. WOODRUFF.

Witnesses:
G. G. ALVORD,
T. STAFFORD.